(12) United States Patent
Knepper

(10) Patent No.: US 12,551,453 B2
(45) Date of Patent: Feb. 17, 2026

(54) COMPOSITIONS AND METHODS OF TREATING AGE-RELATED MACULAR DEGENERATION

(71) Applicant: Paul A. Knepper, Chicago, IL (US)

(72) Inventor: Paul A. Knepper, Chicago, IL (US)

(73) Assignee: Paul A. Knepper, Chicago, IL (US)

( * ) Notice: Subject to any disclaimer, the term of this patent is extended or adjusted under 35 U.S.C. 154(b) by 1003 days.

(21) Appl. No.: 17/574,705

(22) Filed: Jan. 13, 2022

(65) Prior Publication Data

US 2022/0175697 A1    Jun. 9, 2022

Related U.S. Application Data

(63) Continuation-in-part of application No. 16/275,492, filed on Feb. 14, 2019, now Pat. No. 11,234,942, which is a continuation-in-part of application No. 15/752,458, filed as application No. PCT/US2016/047524 on Aug. 18, 2016, now abandoned.

(60) Provisional application No. 62/207,535, filed on Aug. 20, 2015.

(51) Int. Cl.
*A61K 36/906* (2006.01)
*A61K 31/05* (2006.01)
*A61K 31/12* (2006.01)
*A61K 31/352* (2006.01)

(52) U.S. Cl.
CPC ............... *A61K 31/12* (2013.01); *A61K 31/05* (2013.01); *A61K 31/352* (2013.01)

(58) Field of Classification Search
None
See application file for complete search history.

(56) References Cited

U.S. PATENT DOCUMENTS

| 2010/0216859 A1* | 8/2010 | Chen | .................... A61K 31/415 |
|---|---|---|---|
| | | | 558/47 |
| 2015/0080459 A1* | 3/2015 | Sardi | .................. A61K 31/7064 |
| | | | 514/44 R |

\* cited by examiner

*Primary Examiner* — Susan T Tran

(57) ABSTRACT

Age-related macular degeneration (AMD) is treated by administration of a stilbene, a flavonol, and curcumin or a biologically active curcumin analog to a patient afflicted with AMD.

3 Claims, 4 Drawing Sheets

COMPOSITIONS AND METHODS OF TREATING AGE-RELATED MACULAR DEGENERATION

CROSS-REFERENCE TO RELATED APPLICATIONS

This application is a continuation-in-part and claims priority of U.S. patent application Ser. No. 16/275,492, filed on Feb. 14, 2019, which application is a continuation-in-part of U.S. patent application Ser. No. 15/752,458, filed on Feb. 13, 2018, which, in turn, is a Section 371 National Stage of PCT/US2016/047524, filed on Aug. 18, 2016, and claims benefit of U.S. Provisional Application Ser. No. 62/207,535, filed on Aug. 20, 2015, each of which is incorporated herein by reference.

FIELD OF INVENTION

This invention relates to treatment of age-related macular degeneration.

BACKGROUND OF INVENTION

Age-related macular degeneration (AMD) is a disease that causes blurred or reduced vision due to the thinning of the macula, a part of retina responsible for clear vision in direct line of sight. AMD affects about 50 million individuals worldwide. In the United States, an estimated 1.75 million individuals currently suffer from AMD.

There are two basic types of AMD—dry and wet. About 85 to 90 percent of the AMD cases are the "dry" (atrophic) type while about 10 to 15 percent are the "wet" (exudative) type.

The cause of the dry form is multifactorial with genetic, epigenetic, and immunological components. At present, the vitamin and supplement formulations described in Age Related Eye Disease Studies (AREDS and AREDS2) have some benefit in reducing progression rates; however, the results are mixed [Chew, 2009]. The late or advanced form of AMD has two types: the dry form with geographic atrophy and the wet form with choroidal neovascularization, which hemorrhage and can cause significant visual loss. The wet form currently is treated with intraocular injections of anti-vascular endothelial growth factor (VEGF) antibodies.

Drusen are small, yellow deposits of fatty proteins that accumulate under the retina and are associated with the onset of AMD. Drusen are disruptive to the retinal pigment epithelium (RPE) and create a pro-inflammatory and toxic environment to the macula. The innate immune system, and Toll-like receptor 4 (TLR4) specifically, plays a key role in combating toxic or damage-associated proteins (DAMPs), such as β-amyloid, in the macula and contributes significantly to the pro-inflammatory environment created by drusen as illustrated in FIG. 1. The five-year risk of progression is 3.8% in early AMD, 10.8% in intermediate AMD, and 25.4% in intermediate-large AMD as determined by the AREDS study [Davis, 2005]. FIG. 2 shows the relationship between aging and prevalence of early (drusen only) and late [advanced geographic atrophy (GA) or choroidal neovascularization] AMD.

| Prevalence of AMD and Risk of Progression in the US | | |
|---|---|---|
| AMD Category | 2020 US Prevalence, Millions (% of population) | 5-Year Progression to Advanced AMD [5] |
| All AMD* | 16.0 (6.8%) [†] | N/A |
| All Early/Intermediate/Large AMD* | 13.0 (5.1%) | 16.3% |
| Drusen 63-124 μm | 6.2 (2.6%) [§] | 3.3% |
| Drusen 125-249 μm | 4.3 (1.8%) [§] | 20.3% |
| Drusen ≥250 μm | 2.5 (1.1%) [§] | 25.4% |
| All Advanced AMD* | 3.0 (1.3%) | N/A |
| Geographic atrophy ≥150 mm² | 1.8 (0.7%) [¶] | N/A |
| Geographic atrophy (nascent <150 mm²) | 0.7 (0.3%) | N/A |
| Geographic atrophy (no CNV) | 1.0 (0.4%) | N/A |
| Geographic atrophy (with CNV) | 0.8 (0.3%) | N/A |
| Choroidal neovascularization | 1.2 (0.6%) [¶] | N/A |

*All AMD defined as the presence of any drusen ≥63 μm, geographic atrophy, or choroidal neovascularization; Early AMD defined as drusen 63-124 μm; Intermediate AMD defined as drusen 125-249 μm; Large AMD defined as drusen ≥250 μm; Advanced AMD defined as the presence of geographic atrophy, choroidal neovascularization, or both.
** Progression to moderate vision loss defined as a loss of 15 letters or more on a best-corrected visual acuity examination.
Key:
AMD, age-related macular degeneration;
CNV, choroidal neovascularization.
[†] Number shown is 2016 prevalence number (11 million) adjusted to 2020 prevalence number using the known incidence of all AMD (1.16% of adults per year), the number of adults in the US (235 million), and the rate of death for adults in the US (0.74% per year): (1.16% − 0.74%) = 0.42%*(235 million) = 4.94 million new cases since 2016.
[§] Prevalence numbers are based on the total number of early, intermediate, and large AMD subjects (13 million) and the relative proportions of patients with drusen 63-124 μm, 125-249 μm, and ≥250 μm reported in large populations.
[¶] Prevalence numbers for geographic atrophy and choroidal neovascularization estimated using the known total of Advanced AMD cases and the proportion of geographic atrophy (60%) to choroidal neovascularization cases (40%).

Currently there are no effective preventive measures or treatment available for patients suffering from dry AMD. Accordingly, there is a need for new approaches to treat dry AMD.

SUMMARY OF INVENTION

Dry AMD is treated by oral administration to a patient afflicted with AMD a therapeutically effective amount of a synergistic combination of a stilbene, a flavonol, and a curcumin compound as active ingredients. A preferred stilbene is resveratrol (R), a preferred flavonol is quercetin (Q), and a preferred curcumin compound is curcumin (C).

Preferably stilbene, flavonol, and curcumin compound are administered daily in the following amounts: 20 to 5,000 milligrams of stilbene, 24 to 5,000 milligrams of flavonol, and 20 to 12,000 milligrams of curcumin compound.

DESCRIPTION OF PREFERRED EMBODIMENTS

Figure 1:
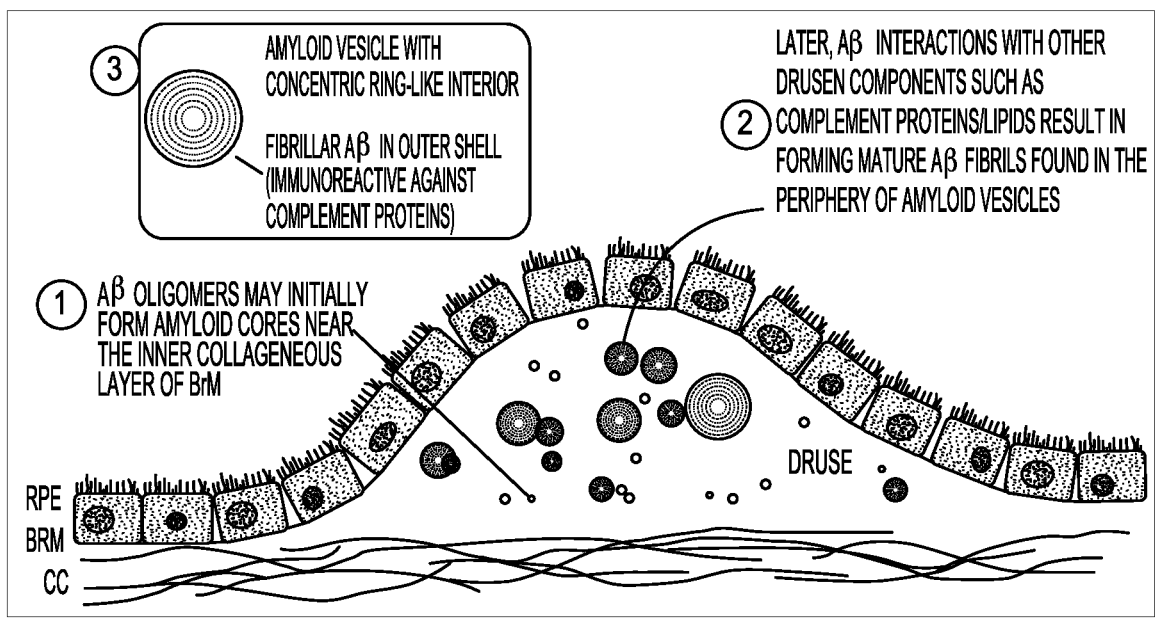
FIG. 1 shows a schematic view of drusen. Aggregated β-amyloid (Aβ) forms vesicles with concentric ring-like interiors and exterior shells of fibrillar AP. RPE, retinal pigment epithelium: BrM, Bruch's membrane; CC, Choriocapillaris. Source: Ratnayaka, 2015.
Figure 2:
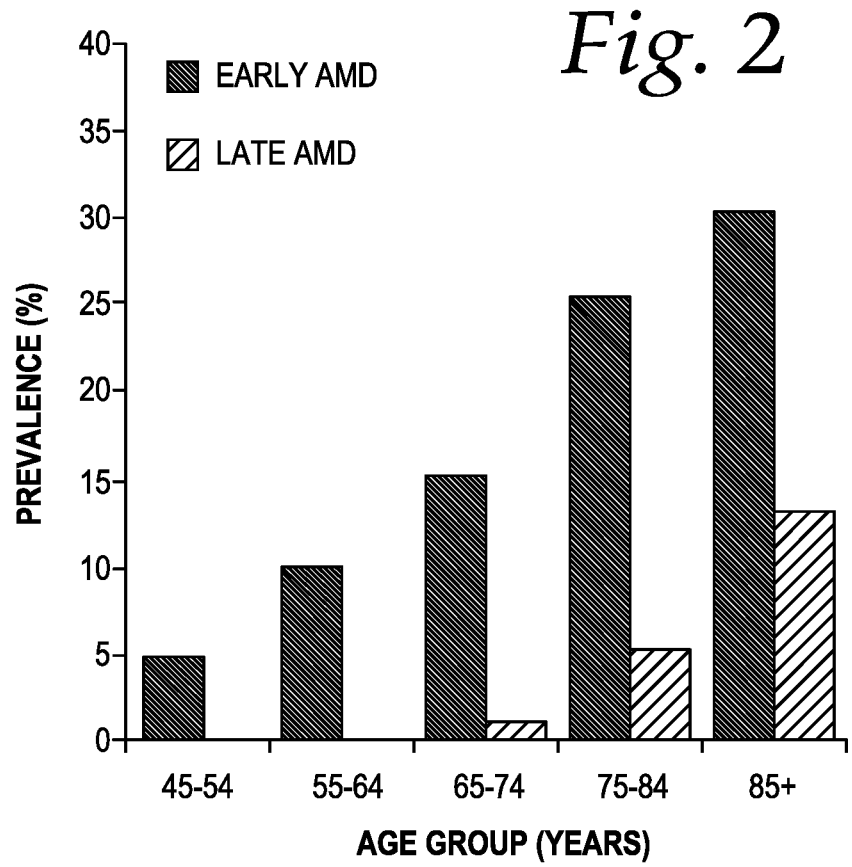
FIG. 2 is a bar graph showing the relationship between age of the patient and the prevalence of early and late (advanced) macular degeneration.
Figure 3:
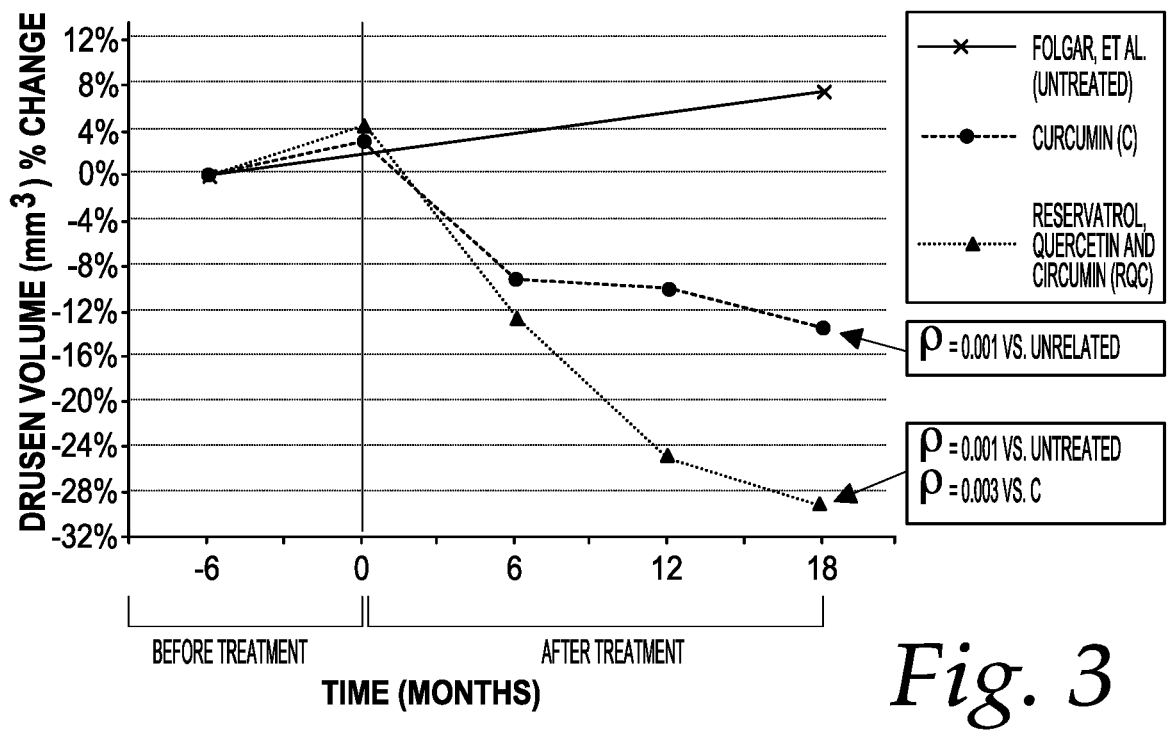
FIG. 3 shows the percentage change in total drusen volume (mm³) in untreated AMD subjects, those taking curcumin (C), or those taking resveratrol, quercetin, and curcumin in combination (RQC) over 18 months. Subjects initiated oral administration of C or RQC at time 0. Data from the 6 months prior to initiating C or RQC was evaluated to provide a comparison between treated and untreated outcomes in the same group of subjects.

Selected embodiments of the invention are shown and described herein. These embodiments are presented by way of example only. Variations, changes and substitutions will readily occur to those skilled in the art without departing from the invention.

Unless defined otherwise, all technical and scientific terms used herein have the same meaning as is commonly understood by one skilled in the art to which this invention belongs.

As used herein and in the claims, the singular form "a," "an," and "the" includes plural references unless the context clearly dictates otherwise.

The terms "treatment," or "treating" or "ameliorating" as used in the specification and claims refer to an approach for achieving beneficial or desired results, including but not limited to a therapeutic benefit and/or a prophylactic benefit.

The term "therapeutic benefit" as used in the specification and the claims means eradication or amelioration of the underlying disorder being treated. A therapeutic benefit is achieved with the eradication or amelioration of one or more of the physiological symptoms associated with the underlying disorder such that an improvement is observed in the subject, notwithstanding that the subject may still be afflicted with the underlying disorder. For prophylactic benefit, the present compositions may be administered to a subject at risk of developing a particular affliction or disease, or to a subject reporting one or more of the physiological symptoms of a disease even though a diagnosis of the disease may not have been made.

The term "antagonist" as used in the specification and claims refers to a compound having the ability to inhibit a biological function of a target protein or receptor. Accordingly, the term "antagonist" is defined in the context of the biological role of the target protein or receptor.

The term "effective amount" or "therapeutically effective amount" refers to that amount of active ingredients described herein that is sufficient to achieve the intended effect. The effective amount may vary depending upon the intended application or the subject and disease condition being treated, e.g., the weight and age of the subject, the severity of the disease condition, the manner of administration and the like, which can be determined readily by one skilled in the art. The specific dose may vary depending on the particular compounds that constitute the composition, the dosing regimen to be followed, timing of administration, and the physical delivery system in which the composition is carried.

The "effective amount" or "therapeutically effective amount" is determined using methods known in the art such as the evaluation of drug synergy based on a flow cytometry assay to measure platelet activation and superactivation. This method can be used to determine optimal dose ranges for a group of patients by identifying the most effective dose combination on average. This method can also be used to determine optimal doses and/or optimal dose ranges for individual patients.

The term "pharmaceutically acceptable excipient" as used in the specification and claims includes any and all solvents, dispersion media, coatings, antibacterial and antifungal agents, isotonic and absorption retarding agents, and the like. The use of such agents and media for pharmaceutically-active substances is well known in the art. Supplementary active ingredients can also be incorporated into the compositions described herein.

Dosage forms comprise the above-described compounds and a pharmaceutically acceptable carrier therefor. Suitable pharmaceutically acceptable carriers include solids, gels, solutions, emulsions, dispersions, micelles, liposomes, and the like. Pharmaceutically acceptable carriers are those which render the active ingredients amenable to oral delivery and the like.

Compositions embodying the present invention can be prepared in the form of a solid, a gel, a solution, an emulsion, a dispersion, a micelle, a liposome, and the like. The active ingredients are compounded, for example, with a non-toxic, pharmaceutically acceptable carrier for tablets, pellets, capsules, and the like. The carriers include glucose, lactose, gum acacia, gelatin, mannitol, starch paste, magnesium trisilicate, talc, corn starch, keratin, colloidal silica, potato starch, urea, medium chain length triglycerides, dextrans, and other carriers suitable for use in manufacturing preparations, in solid, semisolid, or liquid form.

Compositions containing the active ingredients in a form suitable for oral use are, for example, tablets, troches, lozenges, aqueous or oily suspensions, dispersible powders or granules, emulsions, hard or soft capsules, or syrups or elixirs. Compositions for oral use can be prepared according to any method known to the art for the manufacture of pharmaceutical compositions. Such formulations may contain one or more agents selected from the group consisting of a sweetening agent such as sucrose, lactose, or saccharin, flavoring agents such as peppermint, oil of wintergreen or cherry, coloring agents and preserving agents in order to provide pharmaceutically elegant and palatable preparations. Non-toxic, pharmaceutically acceptable excipients can be, for example (1) inert diluents such as calcium carbonate, lactose, calcium phosphate or sodium phosphate; (2) granulating and disintegrating agents such as corn starch, potato starch or alginic acid; (3) binding agents such as gum tragacanth, corn starch, gelatin or acacia, and (4) lubricating agents such as magnesium stearate, steric acid or talc. The tablets may be uncoated or they may be coated by known techniques to delay disintegration and absorption in the gastrointestinal tract and thereby provide a sustained action over a longer period. A time delay material such as glyceryl monostearate or glyceryl distearate can be utilized as well.

bene, the flavonol, or the TLR4/MD2 receptor antagonist. Such derivatives can be prepared as described in Dong et al., Angew. Chem. Int. Ed., 2014, vol. 53, pp. 9430-9448, and can serve by targeting active serine, tyrosine, threonine, lysine, cysteine or histidine residues.

The stilbene, the flavonol, and the curcumin compound preferably are present in the composition as a synergistic combination. The description and composition of each preferred component is shown below.

|  | Resveratrol | Quercetin | Curcumin |
| --- | --- | --- | --- |
| Names/ Synonyms | 5-[(E)-2-(4-hydroxyphenyl)ethenyl]benzene-1,3-diol | 2-(3,4-dihydroxyphenyl)-3,5,7-trihydroxychromen-4-one;dihydrate | (1E,6E)-1,7-bis(4-Hydroxy-3-methoxyphenyl)-1,6-heptadiene-3,5-dione |
|  | Trans-resveratrol | Quercetin dihydrate | Diferuloylmethane |
|  | 3,4',5-Stilbenetriol | Sophoretin | C.I. 75300 |
|  | Trans-3,5,4'-Trihydroxystilbene | Meletin | Natural Yellow 3 |
| Structural Formula | $C_{14}H_{12}O_3$ | $C_{15}H_{10}O_7$ (+2$H_2O$) | $C_{21}H_{20}O_6$ |
| Chemical Class | Stilbenoid | Flavonoid | Diarylheptanoid |
| Pharmacological Class(es) | Antioxidant, platelet aggregation inhibitor, enzyme inhibitor | Antioxidant | NSAID, antineoplastic, enzyme inhibitor |
| CAS Number | 501-36-0 | 117-39-5 (6151-25-3) | 458-37-7 |
| Source | Japanese knotweed (root) and grape (fruit) |  | Turmeric (root) |
| Formulation | Trans-resveratrol | Quercetin dihydrate | Turmeric extract standardized to 95% curcuminoids |

In some embodiments, compositions for oral use are in the form of hard gelatin capsules wherein the active ingredient is mixed with inert solid diluent(s), for example, calcium carbonate, calcium phosphate or kaolin. In the form of soft gelatin capsules the active ingredients are mixed with water or an oil medium, for example, peanut oil, liquid paraffin, olive oil, and the like.

The term "unit dosage form" as used in the specification and claims refers to physically discrete units suitable as unitary dosages for human subjects, each unit containing a predetermined quantity of active material calculated to produce the desired therapeutic effect in association with the required pharmaceutical diluent, carrier, or vehicle. The specifications for the novel unit dosage forms of this invention are dictated by and directly dependent on (a) the unique characteristics of the active material and the particular therapeutic effect to be achieved, and (b) the limitations inherent in the art of compounding such active material for therapeutic use in humans and animals, as disclosed in detail in the specification, these being features of the present invention. Examples of suitable unit dosage forms in accord with this invention are tablets, capsules, pills, powder packets, granules, wafers, sachets, segregated multiples of any of the foregoing, and other forms as herein described.

The designation "µM," as used herein, denotes the micromolar concentration ($10^{-6}$ mol/L) of the indicated compound, e.g., the stilbene, the flavonol, curcumin, and biologically active analogs of curcumin.

Compositions embodying the present invention contain as active ingredients a stilbene or any of its biologically active derivatives or metabolites, a flavonol or any of its biologically active derivatives or metabolites, and a curcumin compound or any of its biologically active derivatives or metabolites.

Also, suitable biologically active derivatives of the foregoing are the covalently binding fluorosulfonyl ($FO_2S$—) and fluorosulfonyloxy ($FO_2SO$—) derivatives of the stil- Resveratrol Resveratrol (trans-resveratrol; 5-[(1E)2-(4-hydroxyphenyl)ethenyl]-1,3-benzenediol) is a naturally occurring stilbenoid polyphenol found in foods such as grapes (wine), certain berries, and peanuts. In plants, resveratrol is produced as a primary response to oxidative stress, injury, and infection. Resveratrol is found in both the trans- and cis-configurations, however the trans-form is more stable and is the predominant form consumed in the average diet. Resveratrol and trans-resveratrol are used synonymously in this document.

Resveratrol has a range of targets including inflammation, oxidative stress, and angiogenesis. The molecule also has other biological effects including vasodilation and β-amyloid plaque clearance.

Resveratrol is a known dietary supplement in a variety of formulations and has been determined to be GRAS by the FDA (GRAS Notice 224). The average daily consumption of resveratrol is estimated to be between 0.1-2.0 mg/day. It has undergone safety and efficacy testing in numerous clinical trials and has been found to be well-tolerated with low toxicity at doses as high as 5 g per day.

Quercetin

Quercetin (5,7,3',4'-flavon-3-ol) is a polyphenol flavonoid found in onions, blueberries, kale, and a variety of other fruits and vegetables. Quercetin, one of the most common plant flavonoids, is the aglycone form of a number of other flavonoid glycosides such as rutin. Quercetin is safe for consumption in humans and has been declared as GRAS by the FDA (GRAS Notices 341, 826, and 916). The average daily consumption of quercetin in the U.S. is estimated to be 10-16 mg. The primary therapeutic effects of quercetin reported in the literature include anti-inflammatory activity, neuroprotective activity, and anti-oxidant activity.

Quercetin is sold as a dietary supplement in a variety of formulations and has undergone safety and efficacy testing in numerous clinical trials. It has been found to be well tolerated and without toxicity in doses as high as 5 g per day.

Curcumin

Curcumin ((1E,6E)-1,7-bis(4-Hydroxy-3-methoxyphenyl)-1,6-heptadiene-3,5-dione) is a naturally occurring diarylheptanoid polyphenol. It is the major curcuminoid found in the roots of turmeric (*Curcuma longa* L.), which is a member of the ginger family Zingaberaceae. Curcumin is a polyphenol with anti-inflammatory, anti-oxidant, anti-apoptotic, and neuroprotective effects.

Curcumin, in a variety of formulations, has been determined to be GRAS by the FDA (GRAS Notices 400, 686, and 822). The average daily consumption of curcumin is estimated to be 2.7-14.8 mg. Curcumin has undergone multiple clinical trials, which have all concluded that curcumin is safe for use in humans at high doses. A review of clinical trials with curcumin indicates that it is safe and well tolerated at doses up to 8-12 g/day with only minimal side effects which are most often gastrointestinal in nature and resolved naturally or by ingestion with or after meals. No maximum tolerable dose has been reported using curcumin.

Suitable stilbenes for the present compositions are resveratrol (3,5,4'-trihydroxy-trans-stilbene), α,β-dihydroresveratrol (3,4',5-trihydroxybibenzyl), pterostilbene (3',5'-dimethoxy resveratrol), pinosylvin (3',5-dihydroxy-trans-stilbene), piceatannol (3,5,3',4'-tetrahydroxy-trans-stilbene), and the like. Preferred stilbene is resveratrol.

Illustrative covalently binding biologically active derivatives of stilbenes are 3,5-dihydroxy-4-fluorosulfonyl-trans-stilbene, 3,5-dihydroxy-4-fluorosulfonyloxy-trans-stilbene, 3,4'-dihydroxy-5-fluorosulfonyl-trans-stilbene, 3,4'-dihydroxy-5-fluorosulfonyloxy-trans-stilbene, and the like.

Suitable flavonols are quercetin (3,3',4',5,7-pentahydroxy-2-phenylchromen-4-one), 3-hydroxyflavone, azaleatin, fisetin, galangin, gossypetin, kaempferide, kaempferol, isorhamnetin, morin, myricetin, natsudaidain, pachypodol, zhamnazin, zhamnetin, and the like. Preferred flavonol is quercetin.

Illustrative covalently binding biologically active derivatives of flavonols are 3,4',5,7-tetrahydroxy-3'-fluorosulfonyl-2-phenylchromen-4-one, 3,4',5,7-tetrahydroxy-3'-fluorosulfonyloxy-2-phenylchromen-4-one, and the like.

The term "curcumin compound" means curcumin and its biologically active analogs.

Suitable biologically active curcumin analogs are compounds represented by Formula I below, $$Ar^1\text{-L-}Ar^2 \quad \text{I}$$

wherein $Ar^1$ is a phenyl group or a substituted phenyl group represented by Formula II:

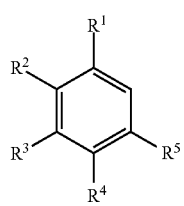

$Ar^2$ is a phenyl group represented by Formula III:

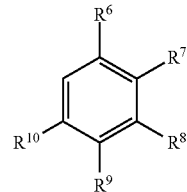

and L is a divalent linking group.

In Formulas II and III each of $R^1$ through $R^{10}$ is independently hydrogen, hydroxyl, methyl, methoxyl, dimethylamine, trifluoromethyl, chloro, fluoro, acetoxyl, cyano, or carboxymethyl.

The divalent linking group L is an alkylene or an alkenylene having 3 to 7 backbone carbon atoms wherein one or more of the backbone carbon atoms is part of a carbonyl or a secondary alcohol. The linking group can be saturated or unsaturated. Preferably, linking group L contains at least one unsaturated carbon-carbon bond.

In a preferred embodiment, L is an alkylene or an alkenylene selected from the group consisting of: —CH=CH—CHO—, —CH=CH—(CO)—CH=CH—, —CH₂—CH₂—(CO)—CH₂—CH₂—, —CH₂—CH₂—CH(OH)—CH₂—CH₂—,

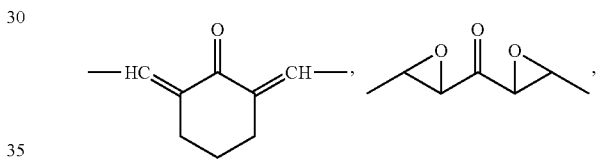

—CH=CH—(CO)—CR=C(OH)—CH=CH—, —CH=CH—(CO)—CR₂—(CO)—CH=CH—, and CH=CH—(CO)—CH=C(OH)—CH=CH—; R is an alkyl or aryl group including 10 carbon atoms or less.

Illustrative covalently binding biologically active derivatives of TLR4/MD2 receptor antagonists are 17-(cyclopropylmethyl)-4,5α-epoxy-3-hydroxy-14-fluorosulfonyl-morphinan-6-one, 17-(cyclopropylmethyl)-4,5α-epoxy-3-hydroxy-14-fluorosulfonyloxy-morphinan-6-one, fluorosulfate derivatives of curcumin, and the like.

Fluorosulfate derivatives of curcumin can be produced by treating available phenolic OH groups of curcumin with sulfuryl fluoride (SO₂F₂) as described in U.S. Pat. No. 10,117,840 to Dong et al.

The foresaid active ingredients of the present invention can be administered as oral dosage forms such as tablets, capsules (each of which can include sustained release or timed release formulations), pills, and the like.

The dosage regimen utilizing the active ingredients of the present invention is selected in accordance with a variety of factors including type, species, age, weight, sex and medical condition of the patient; the severity of the condition to be treated and the route of administration; the renal and hepatic function of the patient; and the particular composition employed. An ordinarily skilled physician or clinician can readily determine and prescribe the effective amount of the drug required to prevent, counter or arrest the progress of the condition.

To determine the "effective amount," the minimum dose and the maximum possible dose was first calculated for each component in order to form a range of effective doses. The minimum effective dose concentration for each component of RQC is 0.1 μM R, 0.1 μM Q, and 0.001 μM C, corresponding to daily doses of 20 mg/day R, 24 mg/day, and 20 mg C based on the bioavailability calculations shown in TABLE 7, below. The maximum dose is defined as the highest dose of each component evaluated in a repeated-dose clinical trial and found to be safe and tolerable. The maximum dose for each component of RQC is 5000 mg/day R, 5000 mg/day Q, and 12000 mg/day C, corresponding to estimated plasma concentrations of 25 μM R, 21 μM Q, and 0.6 μM C based on the bioavailability calculations in TABLE 7, below. The minimum dose and the maximum dose for each component therefore form the following range of effective doses:

| RQC Component | Daily dose (mg/day) | Plasma concentration (μM) |
| --- | --- | --- |
| Resveratrol | 20-5,000 | 0.1-25 |
| Quercetin | 24-5,000 | 0.1-21 |
| Curcumin | 20-12,000 | 0.001-0.6 |

The dose ranges given above constitute a range of "effective amounts" for each component of RQC. Optimal dosing for the treatment and/or prevention of age-related macular degeneration is determined by an evaluation of synergistic drug interactions and considerations for tolerability and/or experimental findings regarding tolerability.

Synergistic drug interactions are determined using the in-vitro flow cytometry platelet assay described below.

Briefly, platelet-rich plasma (PRP) from patients with age-related macular degeneration (n=9) are isolated from whole blood and challenged using dual agonists thrombin and convulxin (collagen substitute) to stimulate superactivated platelets (SAPs). SAPs are defined as positive for surface fibrinogen and negative for activated integrin αIIbβ3, whereas activated platelets are defined as negative for surface fibrinogen and positive for activated integrin αIIbβ3. Surface fibrinogen is detected by pre-treating platelets with biotinylated-fibrinogen (5 μg/mL) followed by staining with any common fluorophore conjugated to streptavidin. The streptavidin-fluorophore complex binds to the biotin-fibrinogen complex present on SAPs but not activated platelets due to the differing composition of charged surface proteins. Activated integrin αIIbβ3—characteristic of activated platelets—is detected using the PAC-1 antibody conjugated to any compatible fluorophore. PAC-1 does not bind to the de-activated form of integrin αIIbβ3 present on the surface of SAPs and is therefore used to distinguish SAPs from the larger population of activated platelets. The effect of RQC on SAPs is determined by pre-treating diluted PRP samples with combinations of R, Q, and/or C for 5 minutes at 37° C. followed by challenge with thrombin and convulxin for 5 minutes at 37° C. The samples are then stained with the fluorophore-conjugates and fixed in 3% formalin before analysis using a flow cytometer. SAP percentage is calculated as a percentage of all platelets. The effect size of RQC is determined by the change ion SAP percentage before and after treatment with RQC and is used as input to calculate drug synergy using the CompuSyn software developed by Chou, et al. Drug synergy, additivism, and antagonism are defined as a combination index (CI) score less than, equal to, or greater than 1, respectively. The level of drug synergy can be further stratified by quantile, tertile, or quartile in cases where numerous synergistic doses are compared.

Example 1: Reduction in Drusen Volume with Curcumin/RQC Treatment

As stated hereinabove, dry AMD is a common disease characterized by retinal pathology. A typical finding of dry AMD is the presence of drusen and/or geographic atrophy. TABLE 1 below depicts drusen volume at baseline and after 18 months according to drusen size in all participants (C or RQC). TABLE 2 below depicts drusen volume at baseline and after 18 months according to drusen size in participants taking oral curcumin (2660 mg/day). TABLE 3, below depicts drusen volume at baseline and after 18 months according to drusen size in participants taking oral RQC (resveratrol: 200 mg/day, quercetin: 240 mg/day, curcumin: 2660 mg/day).

To compare the changes in drusen volume found in this study in subjects taking oral curcumin against what would be expected over the natural course of the disease, optical coherence tomography (OCT) scans were evaluated. OCT is a new retinal imaging technology which is useful to analyze drusen volume and geographic atrophy. Each subject was scanned 6 months before treatment. This allowed for the examination of the natural history of a subject's drusen progression compared to progression with treatment.

In total, 15 of the 18 subjects who completed the study had prior OCT scans available. Over the 6 months prior to enrollment, mean drusen volume increased from 9.8 to 10.1 mm$^3$ (3.1%).

TABLE 1

Drusen Volume in Dry AMD Subjects Treated with Oral Curcumin (n = 18) or RQC (n = 5) for 18 Months.

| | Baseline | | 18 Months | | | |
| --- | --- | --- | --- | --- | --- | --- |
| Drusen size (μm) | Volume (mm$^3$) | ±SD | Volume (mm$^3$) | ±SD | % Change | p-value |
| All drusen | 8.85 | 14.34 | 0.78 | 1.41 | −11.4% | 0.006 |
| ≥250 μm | 5.86 | 11.37 | 0.50 | 1.09 | −14.8% | 0.005 |
| 125-249 μm | 3.28 | 4.12 | 0.30 | 0.41 | −9.2% | 0.04 |
| 63-124 μm | 0.89 | 1.21 | 0.90 | 0.94 | 0.9% | 0.47 |

All drusen, drusen ≥250 μm, and drusen 125-249 μm were significantly decreased by C/RQC treatment. Large drusen are amenable to treatment with C/RQC. Volume is expressed in mm$^3$.

Standard deviation (SD) is expressed in mm$^3$. Statistical significance was determined by Wilcoxon Rank Sum test. Drusen volume was measured by manual segmentation using ImageJ software. Drusen size was determined by the widest width of the drusen and expressed in μm. Drusen formation was decreased by C or RQC in all drusen, extra-large drusen ≥250 μm, large drusen 125-249 μm, but not medium drusen 63-124 μm. Therefore extra-large drusen ≥250 μm are highly decreased by 14.8% and large drusen 125-249 μm are highly decreased by 9.2%.

TABLE 2

Drusen Volume in Dry AMD Subjects Treated with Oral Curcumin (n = 18) for 18 Months.

| | Baseline | | 18 Months | | | |
|---|---|---|---|---|---|---|
| Drusen size | Volume (mm$^3$) | ±SD | Volume (mm$^3$) | ±SD | % Change | p-value |
| All drusen | 10.1 | 1.60 | 8.70 | 1.60 | −13.0% | 0.02 |
| ≥250 μm | 7.50 | 1.30 | 6.00 | 1.30 | −20.0% | 0.009 |
| 125-249 μm | 3.80 | 0.05 | 3.70 | 0.05 | −1.6% | 0.21 |
| 63-124 μm | 0.08 | 0.01 | 0.08 | 0.01 | 0.0% | 0.84 |

As show in Table 2, all drusen and drusen ≥250 μm were significantly decreased by C treatment.

Drusen volume is expressed in mm$^3$. Standard deviation (SD) is expressed in mm3. Statistical significance was determined by Wilcoxon Rank Sum test. Drusen volume was measured by manual segmentation using ImageJ software. Drusen size was determined by the widest width of the drusen and expressed in μm. In the curcumin group, total macular drusen volume decreased from 10.1 (±1.60) to 8.7 (±1.6) mm3 (−28.6%, p=0.03) while drusen 250 μm or larger decreased from 0.75 (±1.30) to 6.00 (±1.30) mm3 (−30.0%, p=0.02). AMD subjects taking RQC exhibited greater reductions in total drusen volume (−13.0% vs. −28.6%, p=0.03) and drusen 250 μm or greater (−20.0% vs. −30.0%, p=0.04) than subjects taking curcumin alone.

TABLE 3

Drusen Volume in Dry AMD Subjects Treated with Oral RQC (n = 5) for 18 Months.

| | Baseline | | 18 Months | | | |
|---|---|---|---|---|---|---|
| Drusen size | Volume (mm$^3$) | ±SD | Volume (mm$^3$) | ±SD | % Change | p-value |
| All drusen | 5.60 | 5.6 | 4.21 | 3.2 | −28.6% | 0.03 |
| ≥250 μm | 2.96 | 3.5 | 2.01 | 2.2 | −30.0% | 0.02 |
| 125-249 μm | 1.57 | 1.9 | 1.21 | 1.1 | −16.5% | 0.08 |
| 63-124 μm | 1.22 | 0.3 | 1.01 | 0.2 | −17.2% | 0.12 |

RQC was more effective than C at reducing drusen volume. All drusen and drusen ≥250 μm were significantly decreased by RQC treatment.

Drusen volume is expressed in mm$^3$. Standard deviation (SD) is expressed in mm$^3$. Statistical significance was determined by Wilcoxon Rank Sum test. Drusen volume was measured by manual segmentation using ImageJ software. Drusen size was determined by the widest width of the drusen and expressed in μm. In the RQC group, total macular drusen volume decreased from 5.60 (±5.6) to 4.21 (±3.2) mm3 (−28.6%, p=0.03) while drusen 250 μm or larger decreased from 2.96 (±3.5) to 2.01 (±2.2) mm3 (−30.0%, p=0.02). AMD subjects taking RQC exhibited greater reductions in total drusen volume (−13.0% vs. −28.6%, p=0.03) and drusen 250 μm or greater (−20.0% vs. −30.0%, p=0.04) than subjects taking curcumin alone.

TABLE 4

RQC Decreases Drusen Volume

| | Drusen Volume % change | | |
|---|---|---|---|
| Drusen Size | Curcumin | RQC | p-value |
| All drusen | −13.0% | −28.6% | 0.03 |
| ≥250 μm | −20.0% | −30.0% | 0.04 |
| 125-249 μm | −1.6% | −16.5% | 0.08 |
| 63-124 μm | 0.0% | −17.2% | 0.07 |

As shown in Table 4, above, oral administration of RQC significantly decreased volume in all drusen (p=0.03) and drusen ≥250 μm (p=0.04) compared with curcumin alone. Statistical significance was determined by Wilcoxon Rank Sum test.

Example 2: Reduction in Geographic Atrophy with RQC Treatment

Geographic atrophy is an advanced form of dry AMD. The clinical manifestations are variable with characteristic circular, cookie cutter-like areas of atrophy. The retinal atrophy is through the full thickness of the retina including the retinal pigment epithelium (RPE) and involves the choriocapillaris. The choriocapillaris commonly affects the wet form of AMD. At present, there is no treatment modality for geographic atrophy and it cannot be reversed. The goal of treatment is to slow the growth of geographic atrophy. The effect of RQC and curcumin on geographic atrophy growth was evaluated in a Phase 1 study (TABLE 5, below)

TABLE 5

Geographic Atrophy Area in Individual Dry AMD Subjects Treated with C or RQC for 12 months.

| Subject | Arm | Eye | Area (mm$^2$), Baseline | Area (mm$^2$), 12 mo | Growth Rate (mm$^2$/y) | Growth Rate (mm/y) | GA Category |
|---|---|---|---|---|---|---|---|
| 1 | C | OS | 1.794 | 3.256 | 1.462 | 0.373 | GA |
| 1 | C | OD | 2.254 | 3.512 | 1.258 | 0.465 | GA |
| 2 | C | OS | 0.147 | 0.110 | −0.037 | −0.046 | Nascent |
| 3 | C | OD | 0.134 | 0.171 | 0.037 | 0.055 | Nascent |
| 4 | RQC | OS | 5.577 | 6.676 | 1.099 | 0.226 | GA |
| 4 | RQC | OD | 3.859 | 3.256 | −0.603 | −0.157 | GA |
| 5 | RQC | OD | 2.880 | 3.620 | 0.740 | 0.206 | GA |
| 6 | RQC | OS | 0.312 | 0.456 | 0.143 | 0.121 | GA |
| 6 | RQC | OD | 0.163 | 0.154 | −0.009 | −0.011 | GA |
| 7 | RQC | OS | 0.698 | 0.828 | 0.130 | 0.082 | GA |
| 7 | RQC | OD | 0.204 | 0.204 | 0.000 | 0.000 | GA |
| 8 | RQC | OD | 0.237 | 0.264 | 0.027 | 0.029 | GA |
| 9 | RQC | OD | 0.142 | 0.152 | 0.010 | 0.013 | Nascent |
| 10 | RQC | OS | 0.078 | 0.105 | 0.027 | 0.052 | Nascent |

Geographic atrophy (GA) is reported in both mm$^2$ and square root transformed mm. Rate of change is reported in mm2/year. C, curcumin; RQC, resveratrol, quercetin, and curcumin in combination; OD, right eye; OS, left eye.

Nascent GA, defined as baseline lesion size <150 mm2, was present in 4 eyes from 3 subjects (1 subject taking curcumin, 2 subjects taking RQC). The growth rate of nascent GA is unknown, although nascent GA is known to progress to GA within 1-2 years. Nascent GA was found to have a slower growth rate than GA. The nascent GA growth rate was 0.02 mm$^2$/year (0.03 mm/year adjusted) in subjects taking RQC and 0.005 mm$^2$/year (0.01 mm/year adjusted) in subjects taking curcumin. There was no statistical difference between growth rate of nascent GA in subjects taking RQC and curcumin.

Figure 4:
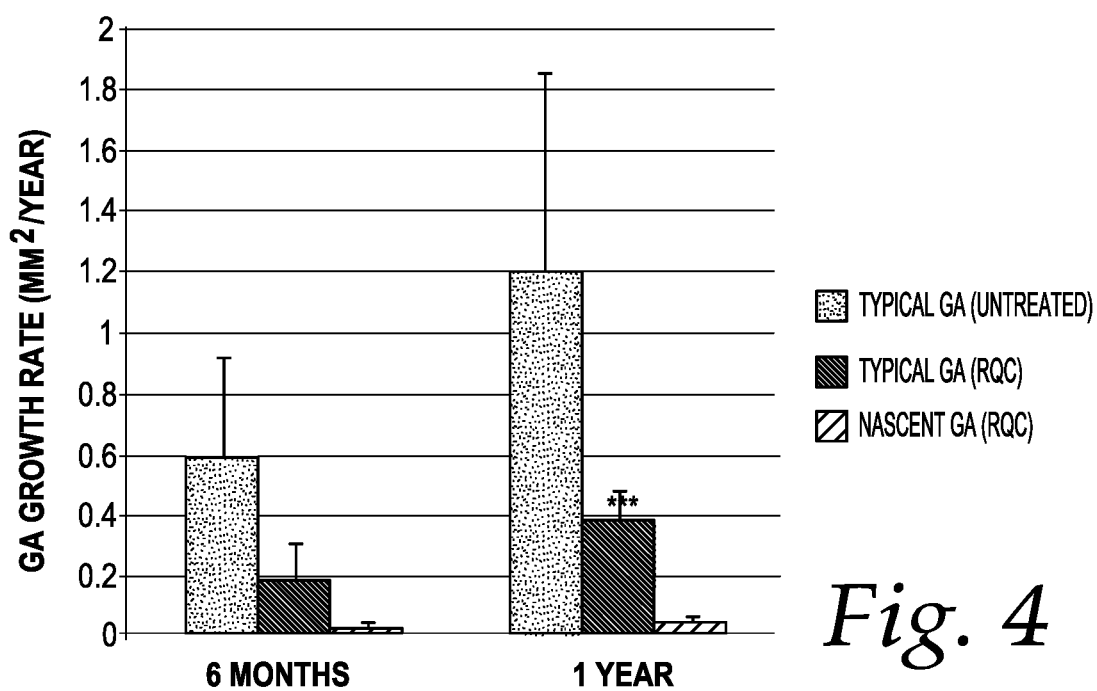
FIG. 4 shows the geographic atrophy (GA) growth rate in mm²/year in an untreated group of AMD subjects (Yehoshua, 2011) and a group treated with RQC (n=9). ***P<0.001 compared with untreated GA.
Figure 5:
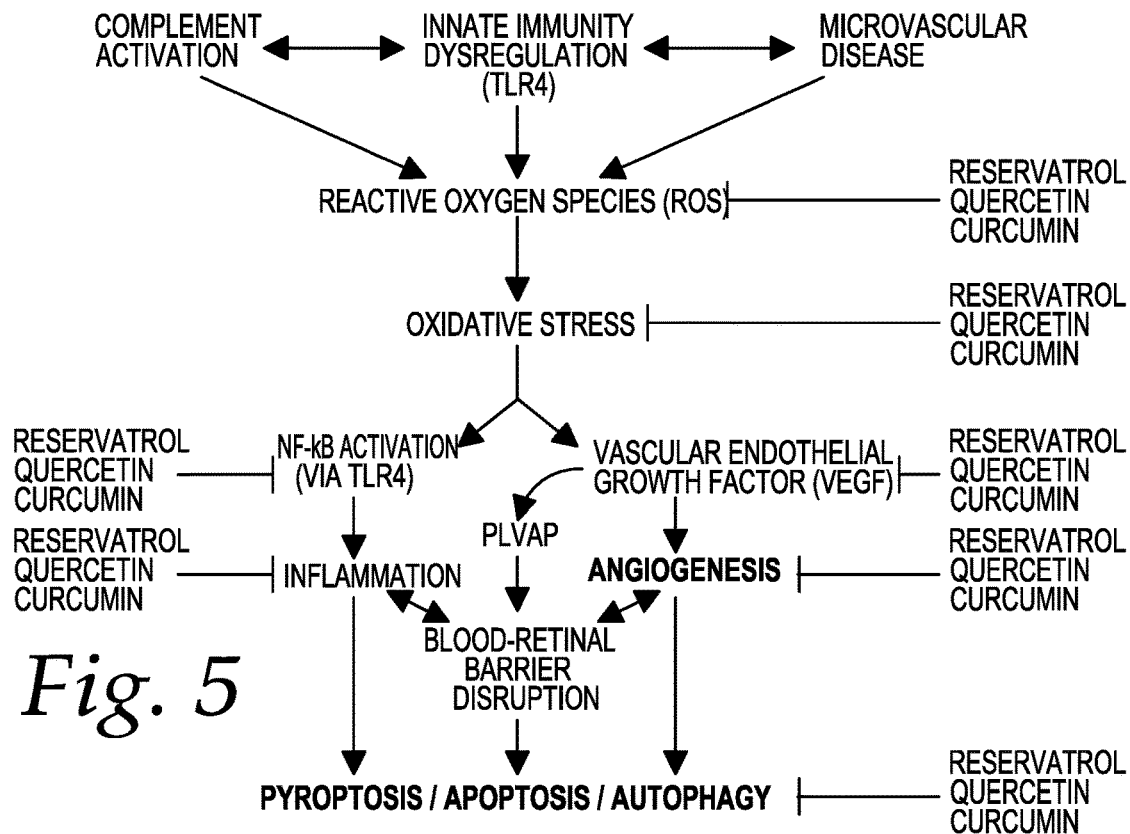
FIG. 5 gives an overview of the pathophysiological mechanisms associated with AMD and the multiple targets of RQC throughout the pathways(s). NF-κB, nuclear factor-κB; PLVAP, plasmalemma-vesicle associated protein; TLR4, Toll-like receptor 4.

The expected untreated GA growth rate reported in the literature is 1.20 mm$^2$/year (or 0.18 mm/year adjusted for baseline lesion area). After 12 months of treatment with RQC, the GA growth rate was found to be 0.19 mm$^2$/year (or 0.06 mm/year adjusted for baseline lesion area), representing a change of −79% in adjusted growth rate (mm/year). See TABLE 6, below and FIG. 4. The decrease in GA growth rate was highly significant (p=0.0004) compared with untreated samples [Yehoshua, et al., 2011] and remained highly significant when adjusted for differences in baseline lesion area (p=0.0001). The GA growth rate of subjects taking RQC was also significantly lower than that of subjects taking curcumin (p=0.02). After 12 months of treatment with curcumin, the GA growth rate was found to be 0.68 mm$^2$/year (or 0.21 mm/year adjusted). The growth rate of subjects treated with curcumin was not significantly different from the untreated population (p=0.43).

achieve a maximum plasma concentration of about 0.6-1.0 µM. This dose taken twice daily accounts for the relatively low half live of curcumin.

The in-vitro dose with the highest average level of synergy was found to be 1 µM R, 1 µM Q, and 0.1 µM C. After accounting for bioavailability, the given doses of 200 mg R, 240 mg Q, and 2000 mg C per day correspond to approximately 1 µM R, 1 µM Q, and 0.1 µM C, respectively.

The average combination index values of low, medium, and high doses of RQC for the inhibition of SAPs in AMD subjects was determined. The Combination Index (CI) theorem derived by Chou-Talalay [Chou, 2010] was calculated for each combination drug treatment of R, Q, and C. The CI is useful in quantifying levels of synergism and antagonism. The theorem is based on the median-effect equation to provide a common link between a single entity and multiple entities. A CI value <1 indicates synergism, a CI equal to 1 indicates additivity, and a CI >1 indicates antagonism. RQC was very effective in low, medium, and high doses.

TABLE 6

Mean Area of Geographic Atrophy (GA) and Nascent GA (nGA) in Dry AMD Subjects Treated with C or RQC for 12 months.

| Arm | n (eyes) | Baseline Area (mm$^2$) | Growth Rate (mm$^2$/y) | Growth Rate (mm/y) | P value* | P value* |
|---|---|---|---|---|---|---|
| RQC - nGA | 2 (2) | 0.11 ± 0.05 | 0.02 ± 0.01 | 0.03 ± 0.03 | 0.03 | — |
| RQC - GA | 5 (8) | 1.74 ± 2.09 | 0.19 ± 0.52 | 0.06 ± 0.13 | Reference | — |
| Curcumin - nGA | 2 (2) | 0.14 ± 0.01 | 0.00 ± 0.05 | 0.01 ± 0.07 | — | 0.006 |
| Curcumin - GA | 3 (4) | 1.08 ± 1.10 | 0.68 ± 0.79 | 0.21 ± 0.25 | 0.02 | Reference |
| Yehoshua (2011) | 64 (86) | 4.59 ± 4.17 | 1.20 ± 0.88 | 0.28 ± 0.17 | 0.0001 | 0.43 |

*P value compares square root transformed (mm/year) growth rates using unpaired Student's t-tests. Geographic atrophy growth rate is converted from mm$^2$/year to the square root transformed mm/year in order to account for differences in baseline lesion size. RQC, resveratrol, quercetin, and curcumin in combination.

Example 3: Synergy Inhibition of Superactivated Platelets with RQC

TABLE 7

Determination of Milligram Dose Ranges and Corresponding Plasma Concentrations

| Compound | Molar Mass (g/mol) | Bioavailability | Half-life (hours) | Milligram (mg) Range and Corresponding Plasma Concentration (µM) | | | | |
|---|---|---|---|---|---|---|---|---|
| Resveratrol | 228.25 | 0.1-0.4% | 2-5 | 2 mg 0.01 µM | 20 mg 0.1 µM | 200 mg* 1.0 µM | 2,000 mg 10 µM | 5,000 mg 25 µM |
| Quercetin | 302.24 | 0.2-0.3% | 3-17 | 2.4 mg 0.1 µM | 24 mg 0.1 µM | 240 mg* 1.0 µM | 2,400 mg 10 µM | 5,000 mg 21 µM |
| Curcumin | 368.38 | 0.01-0.1% | 5-6 | 2 mg 0.0001 µM | 20 mg 0.001 µM | 200 mg 0.01 µM | 2,000 mg* 0.1 µM | 12,000 mg 0.6 µM |

*Doses used in Phase 1 and 2 clinical trials for age-related macular degeneration.

RQC in triple combinations has been found to be synergistic at all dose levels evaluated including all possible combinations of each component at low, medium, and high doses (27 possible combinations). The dose that exhibits the highest degree of synergy on average in AMD subjects (n=9) is 1 µM R, 1 µM Q, and 0.01 µM C, corresponding to a highly synergistic CI score of 0.29. The optimal in vivo dose therefore corresponds to an available dose (i.e. plasma concentration) of 1 µM R, 1 µM Q, and 0.1 µM C. After accounting for the bioavailability properties of each component, an in vivo dose of 1 µM R corresponds to about 200 mg consumed, 1 µM Q corresponds to about 240 mg consumed, and 0.1 µM C corresponds to about 2000 mg consumed.

For curcumin, which has a low bioavailability relative to resveratrol and quercetin, two capsules (1000 mg each)

TABLE 8

Synergy analysis showing the effect of RQC in double and triple combinations on the percentage of superactivated platelets (SAPs) in AMD subjects (n = 9) in vitro.

| | Triple Combinations | | |
|---|---|---|---|
| | R + Q + C (Low) | R + Q + C (Med.) | R + Q + C (High) |
| Mean | 34.6% | 27.5% | 22.6% |
| ±Standard Deviation | 7.2% | 3.9% | 5.3% |
| % Change | −19.0% | −35.4% | −47.0% |
| Combination Index | 0.29 | 0.49 | 0.75 |

The in vitro analysis of RQC in triple combinations in AMD subjects (n=9) is displayed in TABLE 8 above. Low dose corresponds to 1 µM R, 1 µM Q, and 0.01 µM C; Medium dose corresponds 5 µM R, 5 µM Q, and 0.1 µM C; and High dose corresponds to 10 µM R, 10 µM Q, and 1 µM C. RQC in triple combinations at the low, medium, and high dose exhibits a greater degree of synergy compared with any possible double combination of RQ (CI=0.95), RC (CI=1.20), or QC (CI=1.22). RQC exhibits strong synergy in triple combinations at all tested dose levels. The synergy of RQC ranged from 0.22 to 0.75.

TABLE 9

Percentage of synergistic doses out of all double and triple combinations of R, Q, and C

| Cohort | n | Synergistic Double Combinations, n (%) | Synergistic Triple Combinations, n (%) | p value* |
|---|---|---|---|---|
| Control | 8 | 5/27 (18.5%) | 25/27 (92.6%) | <0.0001 |
| AMD | 9 | 6/27 (22.2%) | 25/27 (92.6%) | <0.0001 |

*p values compare double versus triple combinations and were calculated using Chi-square tests with Yates correction.
CI, combination index;
AMD, age-related macular degeneration;
SD, standard deviation;
C, curcumin;
R, resveratrol,
Q, quercetin.

R, Q, and C at three different dose levels each were tested in all possible combinations, resulting in 27 possible double and 27 possible triple combinations within each subject. The doses tested were R (1, 5, and 10 µM), Q (1, 5, and 10 µM), and C (0.01, 0.1, and 1 µM) and the effect was based on the inhibition of SAPs. To obtain the mean number of synergistic doses in each cohort, the average CI score for each dose combination was calculated within each cohort, producing a set of 27 double combination CI scores and 27 triple combination CI scores per cohort. Out of each set of 27 dose combinations, the number of CI scores under 0.8 (highly synergistic) was counted and reported here. For example, in control subjects 5 out of 27 possible double combinations were synergistic while 25 out of 27 possible triple combinations were synergistic based on the mean CI for each dose in the cohort. These results are shown in Table 9 above, and indicate a significant difference in the synergy between double and triple combinations of RQC in each cohort.

Figure 6:
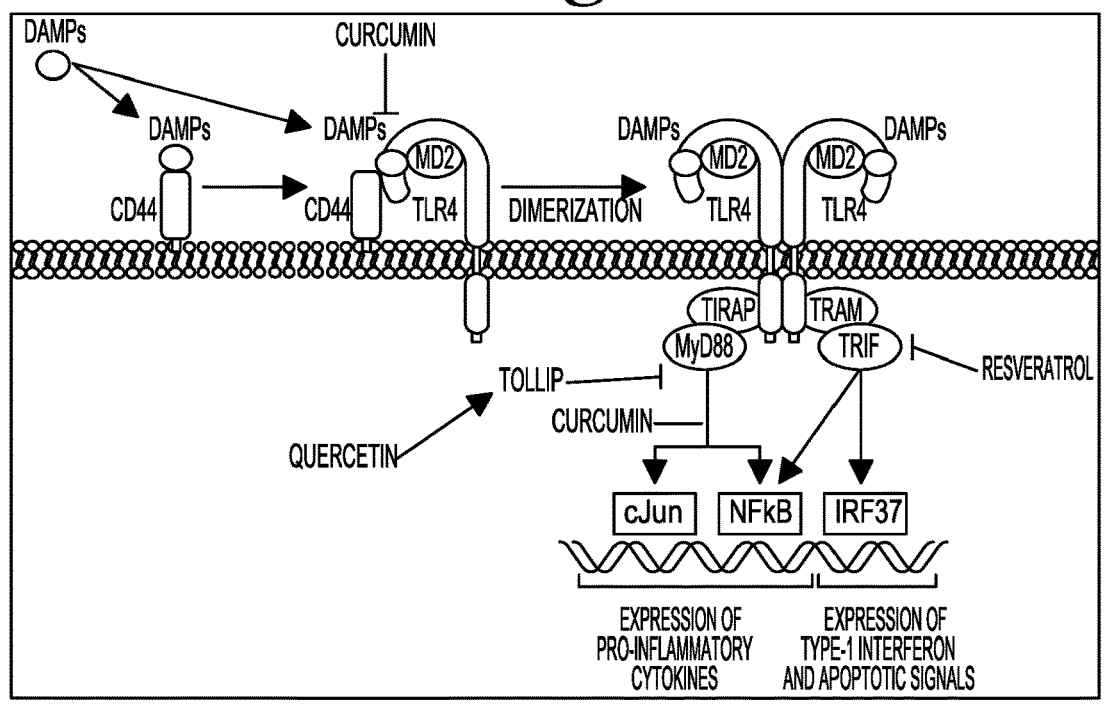
FIG. 6 illustrates how RQC inhibits three specific legs of the TLR4 pathway. Key: DAMPs, damage-associated molecular pattern; IRF3/7, interferon regulatory factors 3 and 7; MD2, myeloid differentiation factor-2; MyD88, myeloid differentiation primary response gene 88; NFκB, nuclear factor κ-light chain-enhancer of activated B cells; TIRAP, TIR-domain containing adaptor protein; TLR4, toll-like receptor 4; TOLLIP, toll-interacting protein; TRIF, TIR-domain-containing adapter-inducing interferon-β; TRAM, TRIF-related adaptor protein.

The TLR4 receptor has three pathways leading to downstream activation: (1) ligand-induced receptor dimerization, (2) the myeloid differentiation primary response gene 88- (MyD88-) dependent pathway, and (3) the TIR-domain-containing adapter-inducing interferon-β- (TRIF-) dependent pathway. RQC targets each of these pathways through various mechanisms. First, resveratrol binds to TRIF complex adaptor proteins TANK-binding kinase 1 (TBK1) and receptor-interacting serine/threonine-protein kinase 1 (RIPK1). Second, quercetin binds TOLL-interacting protein (TOLLIP). Lastly, curcumin binds directly to the TLR4/MD2 complex as well as downstream IKK activity in the MyD88-dependant pathway. See FIG. 6.

RQC act synergistically in an assay measuring TLR4 inhibition and its effect on the formation of superactivated platelets (SAPs). SAPs are a pro-coagulant subtype of activated platelets increased in subjects with AMD. TLR4 inhibitors reduce SAPs more effectively in subjects with AMD than in healthy controls as shown in Tables 10 and 11, below.

In addition, TLR4 inhibitors have inhibitory effects on the complement system through cross-talk mechanisms with TLR4. Evidence suggests that RQC also inhibits complement activity directly. A "dual-blockade" of TLR4 and complement activity is a highly efficient therapeutic strategy for disease with an inflammatory component such as AMD.

TABLE 10

Example of RQC Synergy in a Control Subject

| Control Patient 68 Year Old Caucasian Female Example of Synergy with Combination Index | | | | | | Control Patient 68 Year Old Caucasian Female Example of Synergy with Combination Index | | | | | |
|---|---|---|---|---|---|---|---|---|---|---|---|
| R (µM) | Q (µM) | C (µM) | SAP % | % change | CI* | R (µM) | Q (µM) | C (µM) | SAP % | % change | CI |
| — | — | — | 30.30% | — | — | 1 | 1 | 0.01 | 15.30% | −49.50% | 0.85 |
| 1 | — | — | 24.30% | −19.60% | — | 1 | 5 | 0.01 | 20.90% | −31.10% | 0.66 |
| 5 | — | — | 22.80% | −24.60% | — | 1 | 10 | 0.01 | 22.00% | −27.20% | 0.62 |
| 10 | — | — | 21.00% | −30.50% | — | 5 | 5 | 0.01 | 17.10% | −43.50% | 0.78 |
| — | 1 | — | 19.10% | −36.90% | — | 5 | 1 | 0.01 | 16.80% | −44.60% | 0.8 |
| — | 5 | — | 18.70% | −38.20% | — | 5 | 5 | 0.01 | 13.20% | −56.50% | 0.91 |
| — | 10 | — | 22.80% | −24.70% | — | 10 | 1 | 0.01 | 14.70% | −51.60% | 0.87 |
| — | — | 0.01 | 23.00% | −24.10% | — | 10 | 5 | 0.01 | 12.30% | −59.50% | 0.71 |
| — | — | 0.1 | 19.10% | −36.80% | — | 10 | 10 | 0.01 | 10.10% | −66.70% | 1.02 |
| — | — | 1 | 20.10% | −33.70% | — | 1 | 1 | 0.1 | 15.30% | −49.60% | 0.85 |
| 1 | — | 0.01 | 17.40% | −42.40% | 1.1 | 1 | 5 | 0.1 | 16.10% | −46.90% | 0.82 |
| 5 | — | 0.01 | 20.70% | −31.50% | 1.4 | 1 | 10 | 0.1 | 13.30% | −56.00% | 0.68 |
| 10 | — | 0.01 | 19.50% | −35.50% | 2.6 | 5 | 1 | 0.1 | 15.80% | −47.70% | 0.53 |
| 1 | — | 0.1 | 19.50% | −35.70% | 1.7 | 5 | 5 | 0.1 | 19.40% | −36.00% | 0.39 |
| 5 | — | 0.1 | 19.60% | −35.20% | 3.1 | 5 | 10 | 0.1 | 15.00% | −50.30% | 0.82 |
| 10 | — | 0.1 | 17.10% | −43.60% | 1.58 | 10 | 1 | 0.1 | 13.00% | −57.10% | 0.69 |
| 1 | — | 1 | 17.40% | −42.40% | 1.08 | 10 | 5 | 0.1 | 17.50% | −42.10% | 0.77 |
| 5 | — | 1 | 12.90% | −57.50% | 2.27 | 10 | 10 | 0.1 | 12.20% | −59.90% | 0.26 |
| 10 | — | 1 | 9.50% | −68.70% | 0.43 | 1 | 1 | 1 | 15.20% | −49.90% | 0.85 |
| — | 1 | 0.01 | 15.50% | −48.90% | 1.59 | 1 | 5 | 1 | 12.40% | −59.20% | 0.94 |
| — | 5 | 0.01 | 13.70% | −54.70% | 2.7 | 1 | 10 | 1 | 11.00% | −63.70% | 0.7 |
| — | 10 | 0.01 | 11.50% | −62.20% | 2.79 | 5 | 1 | 1 | 15.50% | −48.90% | 0.84 |
| — | 1 | 0.1 | 21.70% | −28.20% | 2.67 | 5 | 5 | 1 | 14.80% | −51.00% | 0.55 |
| — | 5 | 0.1 | 18.40% | −39.20% | 1.2 | 5 | 10 | 1 | 20.70% | −31.80% | 0.51 |
| — | 10 | 0.1 | 22.20% | −26.60% | 1.55 | 10 | 1 | 1 | 21.50% | −29.00% | 0.64 |
| — | 1 | 1 | 20.90% | −31.10% | 1.43 | 10 | 5 | 1 | 18.90% | −37.70% | 0.56 |

TABLE 10-continued

Example of RQC Synergy in a Control Subject

| Control Patient 68 Year Old Caucasian Female Example of Synergy with Combination Index | | | | | | Control Patient 68 Year Old Caucasian Female Example of Synergy with Combination Index | | | | | |
|---|---|---|---|---|---|---|---|---|---|---|---|
| R (µM) | Q (µM) | C (µM) | SAP % | % change | CI* | R (µM) | Q (µM) | C (µM) | SAP % | % change | CI |
| — | 5 | 1 | 23.30% | −23.20% | 2.62 | 10 | 10 | 1 | 16.40% | −45.80% | 0.34 |
| — | 10 | 1 | 17.70% | −41.50% | 2.81 | | | | | | |
| 1 | 1 | — | 12.50% | −58.70% | 1.59 | | | | | | |
| 1 | 5 | — | 23.90% | −21.10% | 2.7 | | | | | | |
| 1 | 10 | — | 12.90% | −57.50% | 2.79 | | | | | | |
| 5 | 1 | — | 10.20% | −66.40% | 2.67 | | | | | | |
| 5 | 5 | — | 15.30% | −49.30% | 1.2 | | | | | | |
| 5 | 10 | — | 17.10% | −43.70% | 1.55 | | | | | | |
| 10 | 1 | — | 10.20% | −66.30% | 1.43 | | | | | | |
| 10 | 5 | — | 12.60% | −58.50% | 2.62 | | | | | | |
| 10 | 10 | — | 16.00% | −47.10% | 2.81 | | | | | | |

*CI, combination index

TABLE 11

Example of RQC Synergy in an Advanced AMD Subject

| AMD Patient (Geographic Atrophy) 74 Year Old Caucasian Female Example of Synergy with Combination Index | | | | | | AMD Patient (Geographic Atrophy) 74 Year Old Caucasian Female Example of Synergy with Combination Index | | | | | |
|---|---|---|---|---|---|---|---|---|---|---|---|
| R (µM) | Q (µM) | C (µM) | SAP % | % change | CI* | R (µM) | Q (µM) | C (µM) | SAP % | % change | CI |
| — | — | — | 36.8% | — | — | 1 | 1 | 0.01 | 25.0% | −31.9% | 0.25 |
| 1 | — | — | 33.6% | −8.6% | — | 1 | 5 | 0.01 | 20.8% | −43.3% | 0.31 |
| 5 | — | — | 30.5% | −17.1% | — | 1 | 10 | 0.01 | 23.7% | −35.6% | 0.88 |
| 10 | — | — | 29.9% | −18.6% | — | 5 | 5 | 0.01 | 25.3% | −31.2% | 0.87 |
| — | 1 | — | 34.3% | −6.7% | — | 5 | 1 | 0.01 | 27.1% | −26.1% | 0.83 |
| — | 5 | — | 20.6% | −43.9% | — | 5 | 5 | 0.01 | 29.6% | −19.3% | 1.00 |
| — | 10 | — | 26.7% | −27.3% | — | 10 | 1 | 0.01 | 29.2% | −20.5% | 1.00 |
| — | — | 0.01 | 32.5% | −11.5% | — | 10 | 5 | 0.01 | 30.4% | −17.3% | 1.00 |
| — | — | 0.1 | 30.0% | −18.4% | — | 10 | 10 | 0.01 | 26.1% | −28.9% | 0.90 |
| — | — | 1 | 23.2% | −37.0% | — | 1 | 1 | 0.1 | 22.5% | −38.7% | 0.17 |
| 1 | — | 0.01 | 15.3% | −58.3% | 0.04 | 1 | 5 | 0.1 | 25.9% | −29.5% | 0.76 |
| 5 | — | 0.01 | 27.6% | −24.9% | 1.10 | 1 | 10 | 0.1 | 24.3% | −33.9% | 0.98 |
| 10 | — | 0.01 | 23.1% | −37.1% | 1.12 | 5 | 1 | 0.1 | 21.8% | −40.7% | 0.52 |
| 1 | — | 0.1 | 15.6% | −57.7% | 0.04 | 5 | 5 | 0.1 | 23.8% | −35.4% | 0.92 |
| 5 | — | 0.1 | 15.2% | −58.7% | 0.20 | 5 | 10 | 0.1 | 30.5% | −16.9% | 6.31 |
| 10 | — | 0.1 | 28.4% | −22.8% | 2.56 | 10 | 1 | 0.1 | 25.1% | −31.6% | 0.91 |
| 1 | — | 1 | 23.8% | −35.2% | 0.14 | 10 | 5 | 0.1 | 24.5% | −33.5% | 0.92 |
| 5 | — | 1 | 14.1% | −61.7% | 0.17 | 10 | 10 | 0.1 | 20.7% | −43.6% | 0.72 |
| 10 | — | 1 | 22.0% | −40.1% | 0.97 | 1 | 1 | 1 | 21.4% | −41.8% | 0.14 |
| — | 1 | 0.01 | 30.6% | −16.7% | 1.14 | 1 | 5 | 1 | 22.5% | −38.8% | 0.42 |
| — | 5 | 0.01 | 23.3% | −36.5% | 1.12 | 1 | 10 | 1 | 21.7% | −41.0% | 0.62 |
| — | 10 | 0.01 | 33.8% | −8.0% | 1.09 | 5 | 1 | 1 | 24.9% | −32.2% | 0.86 |
| — | 1 | 0.1 | 29.7% | −19.1% | 0.47 | 5 | 5 | 1 | 22.6% | −38.6% | 0.84 |
| — | 5 | 0.1 | 26.1% | −29.1% | 0.93 | 5 | 10 | 1 | 19.6% | −46.6% | 0.71 |
| — | 10 | 0.1 | 30.7% | −16.6% | 1.27 | 10 | 1 | 1 | 21.0% | −42.9% | 0.89 |
| — | 1 | 1 | 29.2% | −20.5% | 1.81 | 10 | 5 | 1 | 17.2% | −53.1% | 0.64 |
| — | 5 | 1 | 25.9% | −29.6% | 0.68 | 10 | 10 | 1 | 17.0% | −53.8% | 0.79 |
| — | 10 | 1 | 28.1% | −23.6% | 2.39 | | | | | | |
| 1 | 1 | — | 28.0% | −23.9% | 0.43 | | | | | | |
| 1 | 5 | — | 31.2% | −15.2% | 0.22 | | | | | | |
| 1 | 10 | — | 30.5% | −17.0% | 1.00 | | | | | | |
| 5 | 1 | — | 19.0% | −48.4% | 2.75 | | | | | | |
| 5 | 5 | — | 27.2% | −25.9% | 1.85 | | | | | | |
| 5 | 10 | — | 28.6% | −22.3% | 1.42 | | | | | | |
| 10 | 1 | — | 24.3% | −33.8% | 4.26 | | | | | | |
| 10 | 5 | — | 23.9% | −35.0% | 3.73 | | | | | | |
| 10 | 10 | — | 25.6% | −30.3% | 2.74 | | | | | | |

*CI, Combination index

RQC acts on TLR4 to reduce formation of SAPs. Individually, the IC50s of R, Q, and C for the reduction of SAPs are 36 µM, 31 µM, and 3.6 µM, respectively.

Example 4: Plasmalemma Vesicle Associated Protein-1 (PLVAP) in AMD

A key pathogenic mechanism in AMD is the breakdown of the choroid and RPE. As stated above, the dry form of AMD is characterized by drusen and geographic atrophy. The initial pathology involves the formation of drusen and/or choroidal abnormalities. The typical choroid changes in the dry form include (1) decrease in the number of choroidal vessels and (2) abnormal vessel formation. PLVAP is significantly altered in the disease process.

PLVAP is a type II integral membrane glycoprotein with a molecular weight of ~70 kDa. It consists of three sections: a short intracellular tail with a caveolin-1 binding domain, a transmembrane domain, and a long 358 amino acid extracellular C-terminal domain with four N-glycosylation sites and two large coiled-coil domains. The coiled-coil domain forms an alpha helix and is hydrophobic to facilitate the formation of an intermolecular superhelix. The helix forms fenestral diaphragms and consist of radial fibrils on their luminal side. PLVAP expression is known to be induced by VEGF through VEGFR-2 and is regulated by the canonical Wnt pathway through β-catenin.

Figure 7:
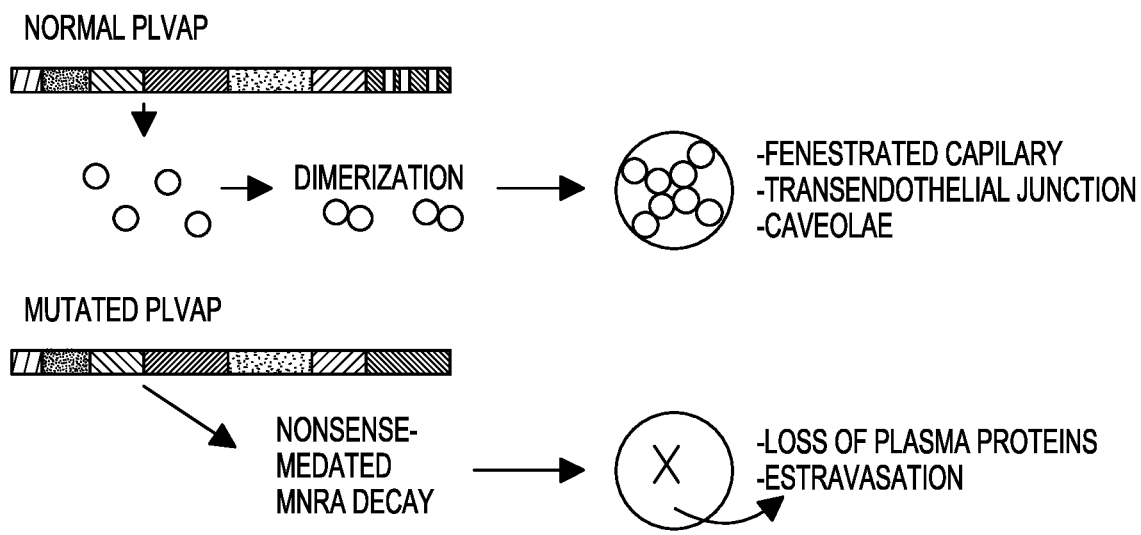
FIG. 7 shows the functional effects of PLVAP mutations. Mutations in the PLVAP gene cause degradation of PLVAP mRNA via nonsense-mediated decay. The loss of PLVAP protein leads to an inability to form diaphragms in fenestrated capillaries, caveolae, and transendothelial junctions. Loss of diaphragms results in leaky vessels, loss of plasma proteins, and hemorrhaging.

The first evidence of PLVAP occurs embryologically as described by Herrnberger, et al. (2012), who found that PLVAP deficiency is in fact lethal (FIG. 7). Electon microscopy has shown that PLAVP deficiency results in protein-losing enteropathy in human infants. Recently, Hernnberger, et al. has shown that PLVAP deficiency remarkably decreases the number of choroidal capillaries and number of fenestrations in the trabecular meshwork [Herrnberger, 2012a/b].

Figure 8:
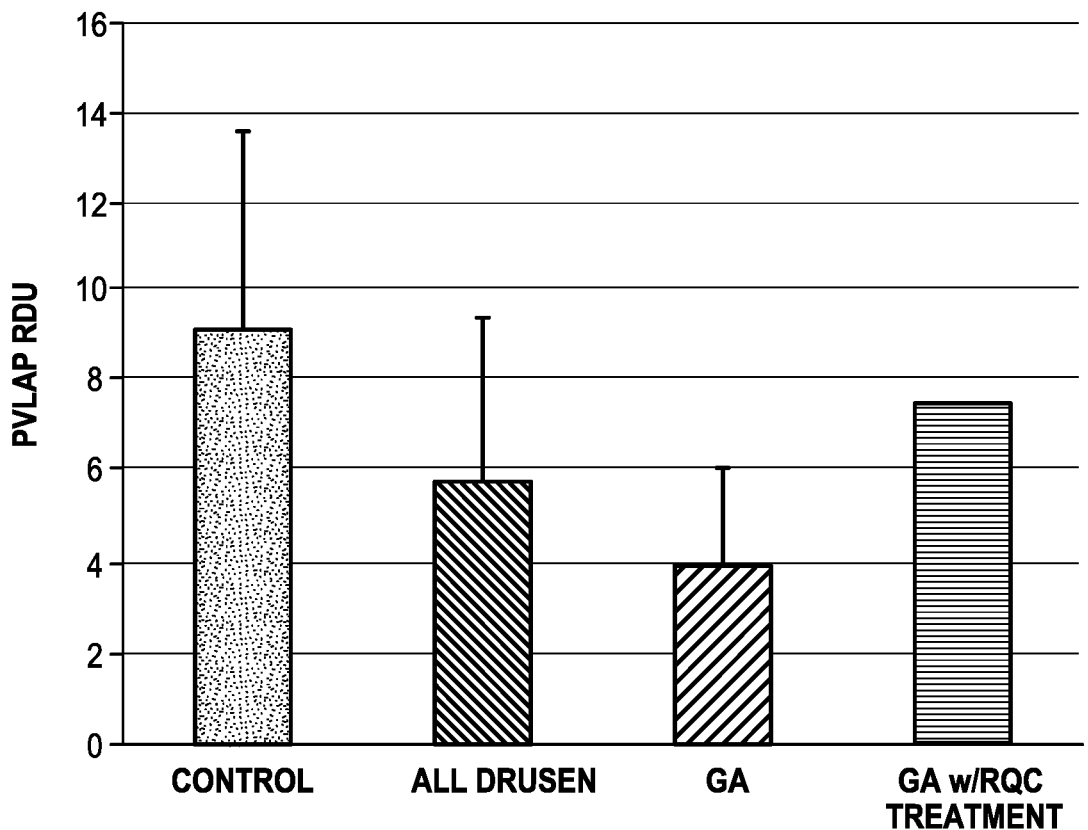
FIG. 8 shows plasma levels of PLVAP measured by Western blot and shown as relative fluorescent units (RDU). PLVAP expression decreases with increasing disease severity, such that AMD subjects with GA exhibit low PLVAP levels. PLVAP levels remarkably increased with RQC treatment in a representative GA subject.

It is known that PLVAP is involved in AD, cancer, traumatic spinal cord injury, acute ischemic brain disease, transplant glomerulopathy, Norrie disease, and diabetic retinopathy [Wisniewska-Kruk et al. 2016; Guo, 2016]. In all of these diseases, PLVAP is upregulated and associated with angiogenesis and inflammation—also key pathogenic mechanisms in AMD. In the brain and eye, upregulated PLVAP is associated with VEGF-induced breakdown of the blood-brain and blood-retinal barriers [Bosma, 2018]. Loss of PLVAP, on the other hand, results in a failure to form diaphragms in fenestrated capillaries, caveolae, and transendothelial junctions. Recent evidence has suggested that PLVAP dysregulation is involved in AMD pathology and may serve as a viable therapeutic target (FIG. 7). Nakagami, et al. [Nakagami, 2019], for example, reported that anti-PLVAP antibodies suppress choroidal neovascularization in a non-human primate model of CNV. Human gene expression and proteomics studies, however, have found PLVAP protein to be decreased locally in the macula of both dry and wet AMD [Newman, 2012; Yuan, 2010]. These studies suggest that PLVAP regulation is altered in AMD and that PLVAP is a viable therapeutic target. It is know that AMD subjects with GA exhibit low PVLAP levels. As shown in FIG. 8, RQC treatment in accordance with the present invention increased PVLAP levels remarkably.

REFERENCES

Chew E Y, Sperduto R D, Milton R C, Clemons T E, Gensler G R, Bressler S B, Klein R, Klein B E, Ferris III F L. Risk of advanced age-related macular degeneration after cataract surgery in the Age-Related Eye Disease Study: AREDS report 25. Ophthalmology. 2009 Feb. 1; 116(2): 297-303.

Davis M D, Gangnon R E, Lee L Y, Hubbard L D, Klein B E, Klein R, Ferris F L, Bressler S B, Milton R C. The Age-Related Eye Disease Study severity scale for age-related macular degeneration: AREDS report No. 17. Archives of ophthalmology (Chicago, Ill.: 1960). 2005 Nov. 1; 123(11):1484-98.

Yehoshua Z, Rosenfeld P J, Gregori G, Feuer W J, Falcão M, Lujan B J, Puliafito C. Progression of geographic atrophy in age-related macular degeneration imaged with spectral domain optical coherence tomography. Ophthalmology. 2011 Apr. 1; 118(4):679-86.

Yehoshua Z, Wang F, Rosenfeld P J, Penha F M, Feuer W J, Gregori G. Natural history of drusen morphology in age-related macular degeneration using spectral domain optical coherence tomography. Ophthalmology. 2011 Dec. 1; 118(12):2434-41.

Ratnayaka J A, Serpell L C, Lotery A J. Dementia of the eye: the role of amyloid beta in retinal degeneration. Eye. 2015 August; 29(8):1013-26.

Doug et al., Angew. Chem. Int'l Ed. 2014, vol. 53, 9430-9448

Chou T C. Drug combination studies and their synergy quantification using the Chou-Talalay method. Cancer research. 2010 Jan. 15; 70(2):440-6.

Herrnberger L, Seitz R, Kuespert S, Bosl M R, Fuchshofer R, Tamm E R. Lack of endothelial diaphragms in fenestrae and caveolae of mutant Plvap-deficient mice. Histochemistry and cell biology. 2012 Nov. 1; 138(5): 709-24.

Herrnberger L, Ebner K, Junglas B, Tamm E R. The role of plasmalemma vesicle-associated protein (PLVAP) in endothelial cells of Schlemm's canal and ocular capillaries. Experimental eye research. 2012 Dec. 1; 105:27-33.

Wisniewska-Kruk J, van der Wijk A E, van Veen H A, Gorgels T G, Vogels I M, Versteeg D, Van Noorden C J, Schlingemann R O, Klaassen I. Plasmalemma Vesicle-Associated Protein Has a Key Role in Blood-Retinal Barrier Loss. The American Journal of Pathology. 2016; 186(4):1044-54.

Guo L, Zhang H, Hou Y, Wei T, Liu J. Plasmalemma vesicle-associated protein: A crucial component of vascular homeostasis. Experimental and therapeutic medicine. 2016 Sep. 1; 12(3):1639-44.

Bosma E K, van Noorden C J, Schlingemann R O, Klaassen I. The role of plasmalemma vesicle-associated protein in pathological breakdown of blood-brain and blood-retinal barriers: potential novel therapeutic target for cerebral edema and diabetic macular edema. Fluids and Barriers of the CNS. 2018 December; 15(1):1-7.

Nakagami Y, Hatano E, Chayama Y, Inoue T. An anti-PLVAP antibody suppresses laser-induced choroidal neovascularization in monkeys. European journal of pharmacology. 2019 Jul. 5; 854:240-6.

Newman A M, Gallo N B, Hancox L S, Miller N J, Radeke C M, Maloney M A, Cooper J B, Hageman G S, Anderson D H, Johnson L V, Radeke M J. Systems-level analysis of age-related macular degeneration reveals global biomarkers and phenotype-specific functional networks. Genome medicine. 2012 February; 4(2):1-8.

Yuan X, Gu X, Crabb J S, Yue X, Shadrach K, Hollyfield J G, Crabb J W. Quantitative proteomics: comparison of the macular Bruch membrane/choroid complex from age-related macular degeneration and normal eyes. Molecular & Cellular Proteomics. 2010 Jun. 1; 9(6):1031-46.

The invention claimed is:

1. A method of treating age-related macular degeneration (AMD) comprising administering to a human subject afflicted with AMD a therapeutically effective synergistic amount of resveratrol, quercetin, and curcumin, together with a pharmacologically acceptable carrier therefor, wherein the therapeutically effective, synergistic amount administered per day is 20 to 5,000 milligrams of resveratrol, 24 to 5,000 milligrams quercetin, and 20 to 12,000 milligrams curcumin.

2. The method in accordance with claim 1 wherein the resveratrol, the quercetin, and the curcumin are administered orally.

3. The method in accordance with claim 1 wherein the therapeutically effective amount administered per day is 200 milligrams resveratrol, 240 milligrams quercetin, and 2000 milligrams curcumin.

* * * * *